MULTIPLEX COMMUNICATION SYSTEM

Filed March 30, 1955 4 Sheets-Sheet 1

INVENTORS
WILLIAM E. WALKER
& CHARLES SHOREYS
BY Charles H. Brown
ATTORNEY

MULTIPLEX COMMUNICATION SYSTEM

Filed March 30, 1955 4 Sheets-Sheet 2

INVENTORS
WILLIAM E. WALKER
& CHARLES SHOREYS
BY Charles H. Brown
ATTORNEY

INVENTORS
WILLIAM E. WALKER
& CHARLES SHOREYS
BY Charles H. Brown
ATTORNEY

INVENTORS
WILLIAM E. WALKER
& CHARLES SHOREYS
BY. Charles H. Brown
ATTORNEY 2,905,760
Patented Sept. 22, 1959

2,905,760

MULTIPLEX COMMUNICATION SYSTEM

William E. Walker, Brooklyn, and Charles Shoreys, Northport, N.Y., assignors to Radio Corporation of America, a corporation of Delaware Application March 30, 1955, Serial No. 497,874

16 Claims. (Cl. 178—50)

Figure 1:
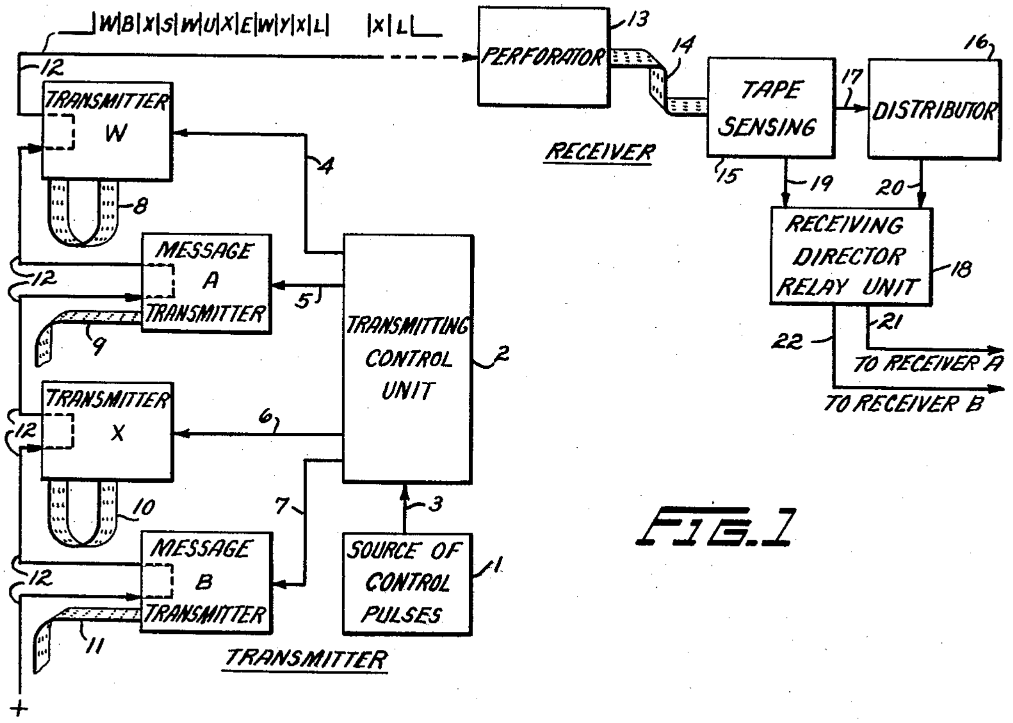

This invention relates to telegraphic communication and, particularly, to an improved time division multiplex telegraph communication system.

The simultaneous transmission of several messages, using any one of the common multi-element coded forms of transmission over a single channel of operation, is a widely used form of communication. In one way of accomplishing such simultaneous transmission, the full capacity of a channel of operation is divided into sub-channels, and each of the sub-channels operates at fractional speed as compared to that of the full channel. Each of the sub-channels is available for the transmission of a message. Multiplexing equipment at the transmitter combines the various messages transmitted over the sub-channels in such a manner that they will be collectively transmitted over the full channel of operation.

In one type of multiplex transmission, the multiplexing equipment will transmit first one character of a first message, a first character of a second message, a first character of a third message and a first character of a fourth message. Assuming that a channel is to be sub-divided into four sub-channels of operation, the multiplexing equipment will thereafter transmit the second character of the first message, the second character of the second message, the second character of the third message, and so on. The multiplexing equipment will continue to transmit over the full channel of operation on a character by character basis until all messages have been completed. This type of transmission is referred to in the art as time division multiplex communication.

In order to effect such transmission, it has been necessary to synchronize the operation of receiving equipment with that of the multiplexing transmitting equipment. The receiving equipment for recording the messages on a printer or other suitable device must be operated so that only that portion of the full channel of operation constituting one of the messages sent over the channel is connected to an individual printer or recording device. The messages which will be distributed to various receiving positions by the receiving equipment will be an accurate reproduction of the messages transmitted by the multiplexing transmitting equipment. Synchronous transmission on a character by character basis requires correctly timed synchronous distribution at the receiver.

In various situations where it is desirable to make use of the multiplex type of communication, the synchronizing equipment may be unavailable. It is also possible that the use of such equipment may be impracticable in a particular application. Various circumstances may prohibit the use of synchronizing equipment to control the operation of a multiplex operated communication system.

It is an object of the invention to obtain an improved automatic telegraph system capable of multiplex message transmission.

It is another object of this invention to enable the collective transmission of a plurality of messages through a telegraph system without the need for synchronization.

It is a further object of this invention to provide a novel type of automatic telegraph system capable of non-synchronous multiplex message transmission.

These objects and others which will appear are accomplished in accordance with the invention, by sequentially operating a group of telegraph transmitters. Control pulses occurring at regular intervals are fed from a suitable source to a transmitting control unit. The transmitting control unit operates in response to the control pulses to sequentially distribute an operate pulse to the transmitters. The transmitters will be operated respectively by the control pulse to transmit one of two types of transmission. In general, an installation will include an even number of transmitters. One-half of the transmitters will repetitiously transmit a directing character in response to the control pulse. The remaining transmitters will operate in response to the control pulse to transmit the regular message communication.

The transmitting control unit sequentially operates the respective transmitters by the control pulse so that a transmitter of a directing character is first operated. Immediately thereafter, a message transmitter is operated to transmit a character of a message which is to be forwarded to a distant receiver. When the message transmitter has completed the transmission of a character, the transmitting control unit operates a second of the directing character transmitters. The second directing character transmitter will transmit a directing character which is different from that transmitted by the first mentioned directing character transmitter. Any character may be chosen so long as it is different from that transmitted by the first mentioned directing character transmitter. When the second directing character transmitter has completed the transmission of a character, the transmitting control unit will operate a second message transmitter so as to transmit a character of a second message which is to be transmitted to a distant receiver.

In summarizing the sequence of operation, as determined by the operation of the transmitter control unit, a directing character is first transmitted. Thereafter, a character of a message to be transmitted is sent. A second directing character different than the first is then sent, immediately followed by a character of a second message which is to be transmitted. The full channel capacity is therefore sub-divided into four sub-channels. One-half of the channel time is utilized by the directing characters which are transmitted over two of the sub-channels. The remaining half of the channel time is utilized for regular message transmission. Two messages will be collectively transmitted over the channel, each message, therefore, occupying one quarter of the full channel capacity. A multiplex communication system is provided whereby two messages may be simultaneously transmitted in interleaved manner over a single channel of operation.

The intelligence carrying output circuits of the telegraph transmitters are connected by a suitable transmission line to receiving equipment located at a subscriber station or at a central office which services a number of subscribers. A perforating or recording device at the receiving equipment records the intelligence on a tape which is, thereafter, fed to a suitable tape sensing mechanism. The tape sensing mechanism transforms the intelligence recorded on the tape into electrical impulses which are distributed to receiver channels. The tape sensing mechanism operates in response to the characters received to forward them to a distributor. At the same time, the tape sensing mechanism completes a path through a receiving director relay unit for the passage of only the message characters from the distributor to one of the available receiver channels, in accordance with the directing character preceding each of the message characters.

All of the message characters preceded by a particular directing character are forwarded to a particular receiver channel. In this manner, the interleaved signals forwarded by the transmitting multiplexing equipment are separated and the respective messages present therein are distributed to the proper receiver channels. The necessity for synchronous operation is eliminated. The directing characters identify the succeeding message character to the tape sensing mechanism. The tape sensing mechanism operates in response to this information to control the distribution of the message characters from the distributor to one of the receiver channels. A path is completed from the distributor through a receiving director relay unit to the receiver channel identified by the directing character preceding each of the message characters.

Synchronously operated communication systems usually require close and careful supervision. Control circuits have been devised which automatically exercise such supervision. In the system of the invention, however, such additional equipment is not necessary. The receiving equipment distributes the message characters to the receiver channels in accordance with the directing characters. The operation of the receiving equipment is independent from that of the multiplexing transmitting equipment in that it requires no synchronizing control from the transmitting equipment. The receiving director relay unit operated in response to the directing characters received by the tape sensing mechanism completes a path for the passage of a message character from the distributor to a receiver channel, as determined by the directing characters received by the tape sensing mechanism. The receiving equipment operating in response to the directing characters is made to distribute the message characters or signals to the proper receiver channels.

Figure 3:
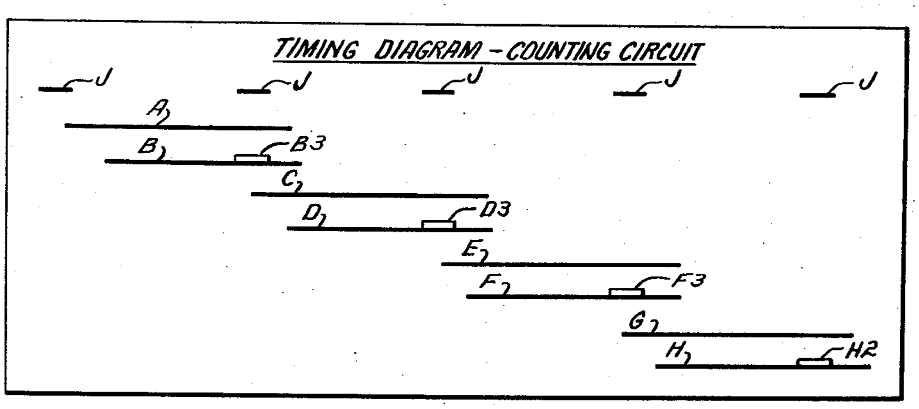
Figure 2:
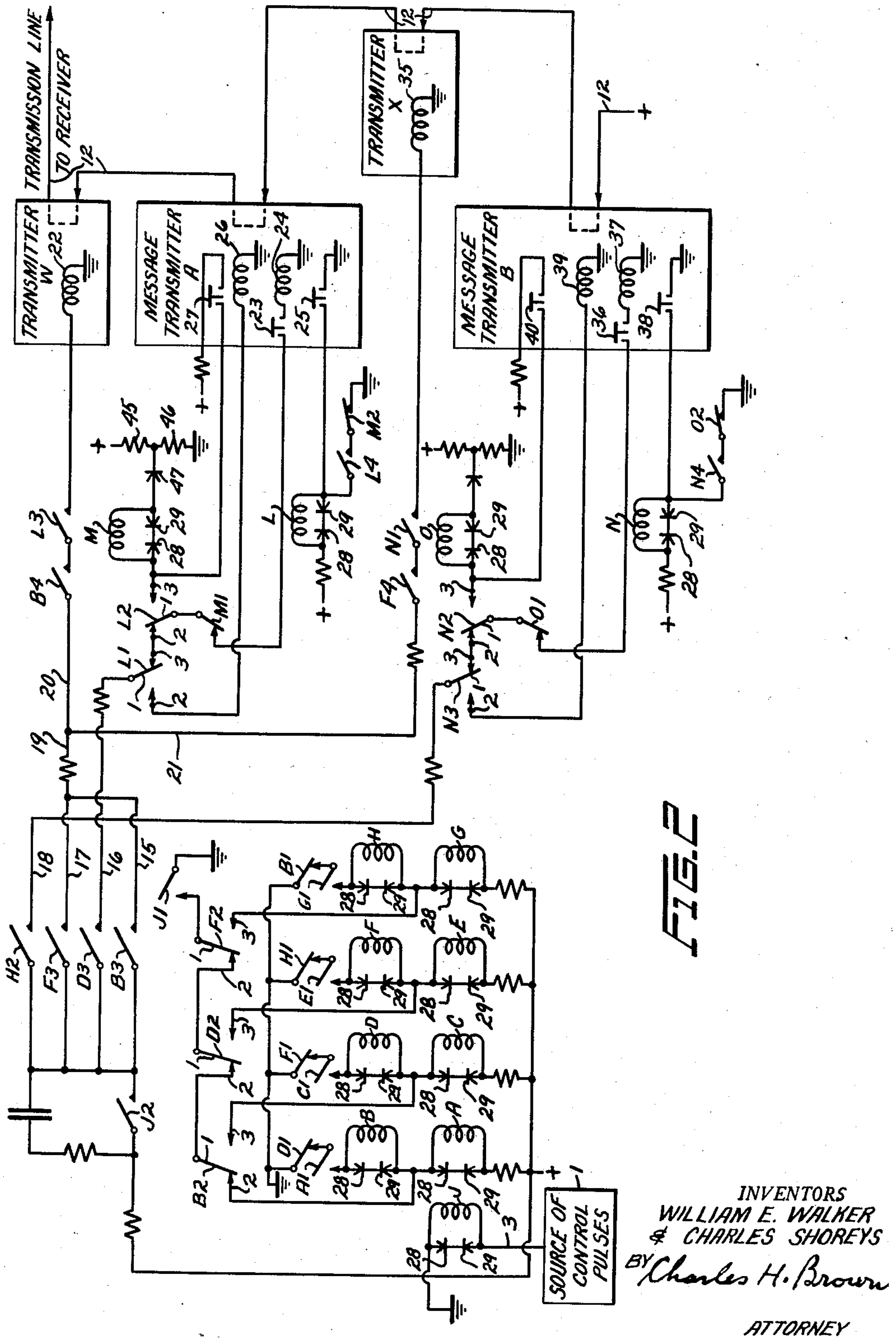
Figure 4:
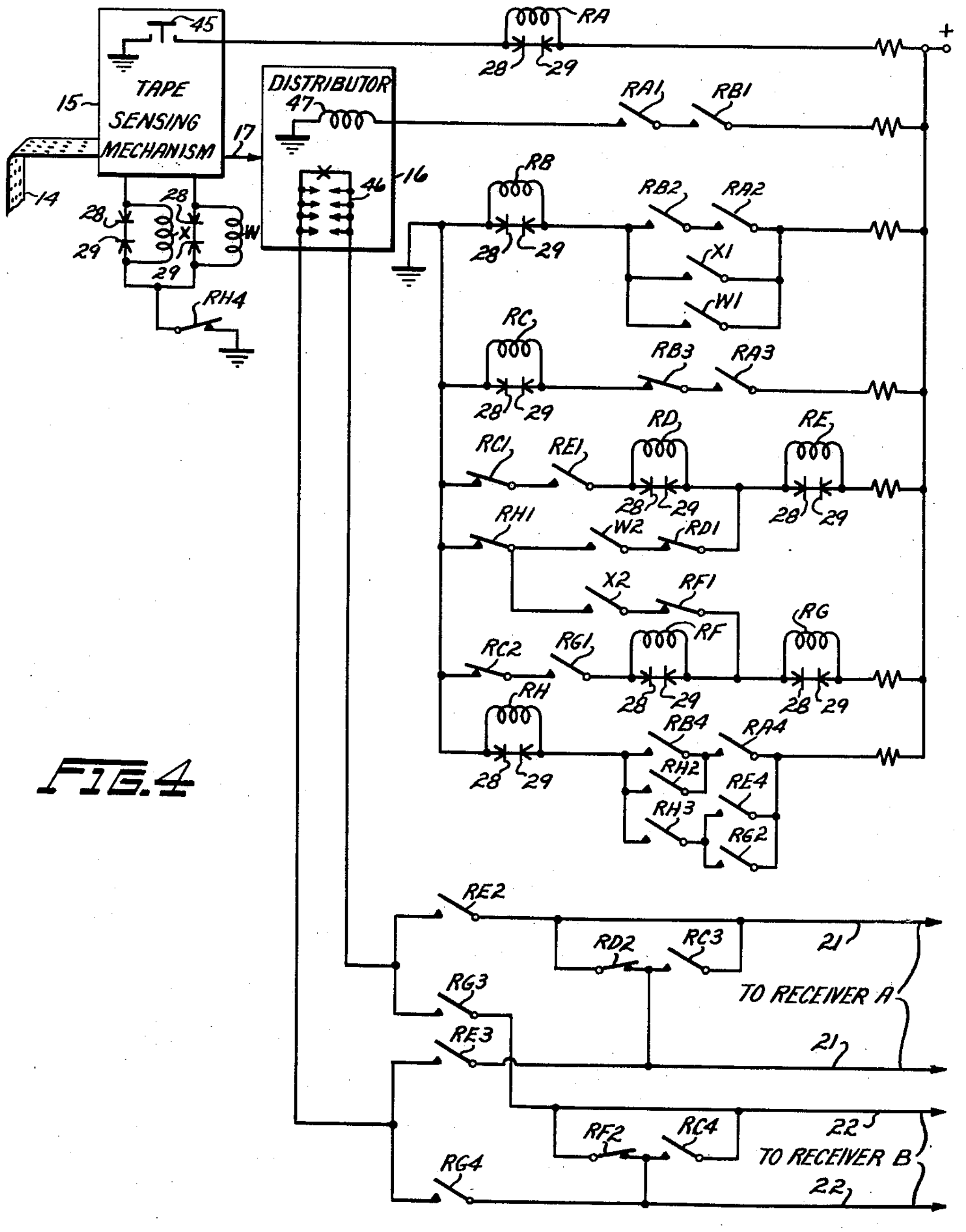
Figure 5:
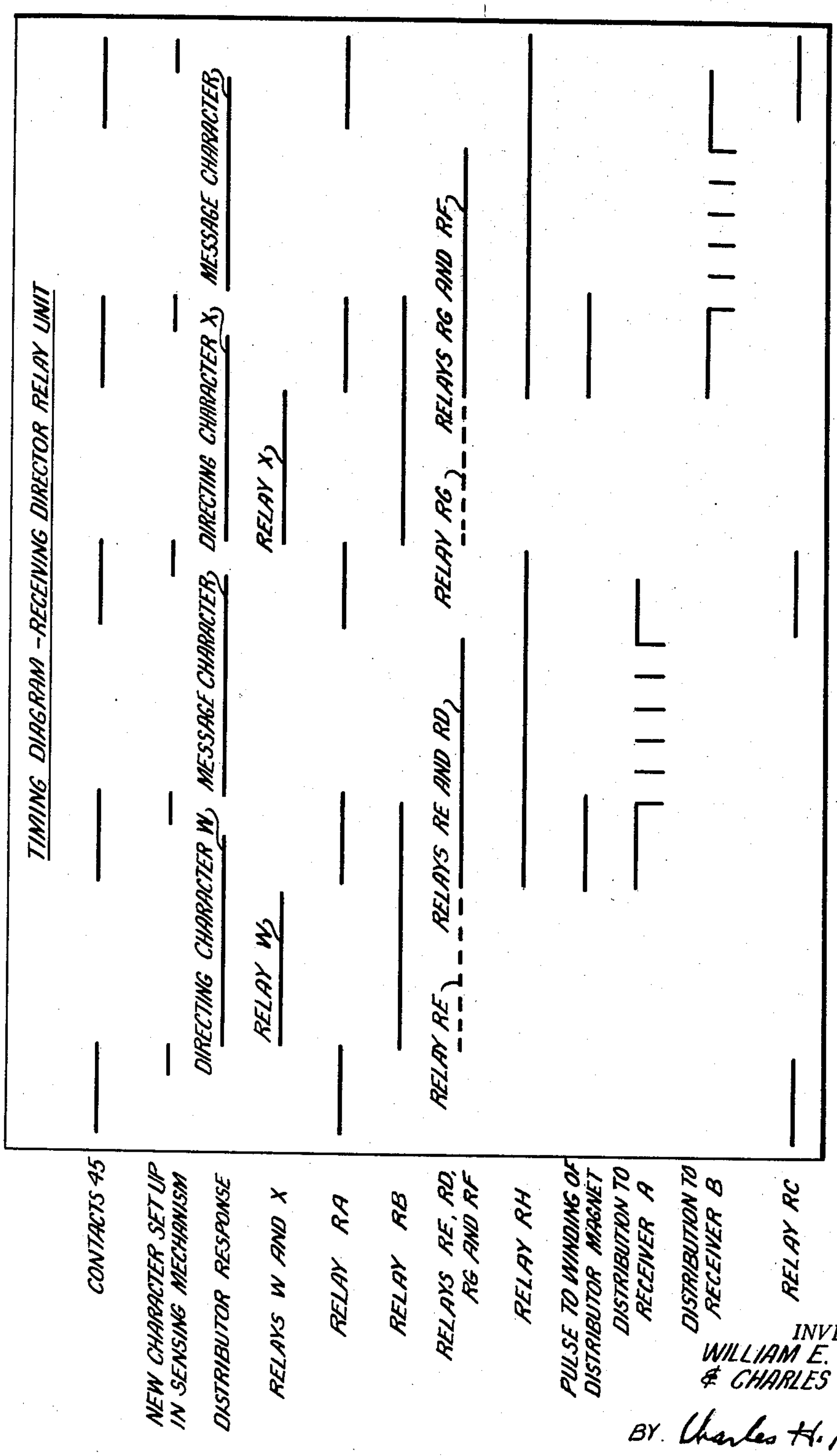

A more detailed description of the invention follows with reference to the accompanying drawing in which:

Figure 1 discloses a block diagram of a multiplex communication system constructed in accordance with the invention, Figure 2 discloses a circuit diagram of a transmitting control unit for use in a multiplex communication system as shown in Figure 1, Figure 3 is a timing diagram disclosing the sequence of operation of the counting circuit shown in Figure 2, Figure 4 is a circuit diagram of a receiving director relay unit for use in a multiplex communication system as shown in Figure 1, and Figure 5 is a timing diagram disclosing the sequence of operation of the various components of the receiving director relay unit shown in Figure 4.

In Figure 1, there is shown in block diagram a multiplex communication system constructed according to the invention. Control pulses occurring at regular intervals are fed from a suitable source 1 to a transmitting control unit 2 by a lead 3. The transmitting control unit 2 sequentially distributes a control pulse to a transmitter W by lead 4, a message transmitter A by lead 5, a transmitter X by lead 6 and a message transmitter B by lead 7. Transmitter W is operated in response to the control pulse to transmit a directing character. For purposes of description, it will be assumed that the character W has been so chosen. However, any character might be used. Transmitter W may be operated by a continuous tape with continuously repeated combinations for the letter W perforated therein or may have the combination fixed in the selecting contacts of the transmitting device. Transmitter W has been shown in Figure 1, for purposes of description, as operated by a continuous tape 8, upon which the character W is repetitiously perforated. Message transmitter A is operated in response to a control pulse fed from transmitting control unit 2 by lead 5 by a tape 9 upon which is perforated or recorded a message which is to be transmitted. Transmitter X is of the same type as transmitter W, and is operated in response to a control pulse fed from the transmitting control unit 2 by lead 6 so as to transmit a directing character. As in the case of transmitter W, any character may be used so long as it differs from that used by transmitter W. It will be assumed that the character X has been so chosen. A continuous tape 10, for purposes of description, operates transmitter X to repetitiously transmit the character X in response to a control pulse fed from the transmitting control unit 2. Message transmitter B is of the same type as message transmitter A and is operated by a tape 11 upon which is perforated or recorded a second message which is to be transmitted. A transmission line 12 connects the output circuit of each of the transmitters so that as each transmitter is sequentially operated by the transmitting control unit 2 feeding a control pulse thereto, each transmitter will sequentially feed a character over the transmission line 12. As understood in the art, the transmission line or path 12 may include cable connections, radio communication equipment and/or other transmission means according to the requirements of a particular application.

A typical message appearing on lead 12 is shown in Figure 1. It will be assumed that message transmitter A is to transmit the word "buy" and that message transmitter B is to transmit the word "sell." Each of the characters transmitted by message transmitter A will be preceded by the directing character W, while each character transmitted by message transmitter B will be preceded by the character X. A signal appearing on lead 12 will have the character make-up shown in Figure 1.

The intelligence carrying output circuits of the telegraph transmitters are connected by transmission line 12 to receive equipment which includes a perforator 13 that records the intelligence on a tape 14. The tape 14 is fed to a tape sensing mechanism 15 which transforms the intelligence recorded on the tape 14 into electrical impulses. The characters transmitted by message transmitters A and B are fed by lead 17 to a distributor 16 from the tape sensing mechanism 15. The tape sensing mechanism 15 controls the operation of a receiving director relay unit 18 through lead 19 in accordance with the directing characters X and W transmitted by transmitters X and W. A path is completed from distributor 16, lead 20 and receiving director relay unit 18 to one of the receiver channels A or B. The receiving director relay unit 18 is controlled so that all of those message characters fed from the distributor 16 which are preceded by the directing character W, as received by the tape sensing mechanism 15, are fed to receiver A, not shown, by lead 21. All of those message characters preceded by the directing character X, as received by the tape sensing mechanism 15, are distributed thru the receiving director relay unit 18 from the distributor 16 to receiver B, not shown, by lead 22. In accordance with the example given in Figure 1, the word "buy" will be distributed to receiver A over lead 21 by the operation of the receiving equipment. Simultaneously, the word "sell" will be forwarded to receiver B over lead 22. In either case, the distribution of the message characters to the respective channels A and B is controlled by the directing characters W and X preceding the message characters received by the tape sensing mechanism 15. The directing characters W and X will control the sequence of operation of the receiving equipment to complete a path from the distributor 16 to one of the receiver channels A or B, completing a path through the receiving director relay unit 18 to a particular receiver channel for the passage of the message signals transmitted by either message transmitter A or message transmitter B.

In Figure 2, there is shown a circuit diagram of a transmitting control unit which in one embodiment may be utilized in the multiplex communication system of the invention, as shown in Figure 1. Control pulses occurring at regular intervals are fed from a suitable source 1 by lead 3 thru the winding of relay J to ground. Upon the appearance of a control pulse, relay J will operate. A path will be completed from the positive terminal of a source of potential to ground thru the winding of relay A, contact 2 and armature 1 of transfer contacts B2 of relay B, contact 2 and armature 1 of transfer contacts D2 of relay D, contact 2 and armature 1 of transfer contacts F2 of relay F and make contacts J1 of relay J. Relay A will operate. Upon the operation of relay A, a path will be completed from the positive terminal to ground thru the winding of relay A, the winding of relay B, make contacts A1 of relay A and break contacts D1 of relay D. The winding of relay B will be grounded at both ends and remain inoperative so long as relay J remains operated by a control pulse from source 1 by the closure of make contacts J1 of relay J and make contacts A1 of relay A. Immediately upon the absence of a control pulse, relay J will be inactivated and make contacts J1 will open, removing the ground connection between the winding of relay A and the winding of relay B, operating relay B. When relay B operates, the armature 1 of transfer contacts B2 will disengage contact 2 and engage contact 3 of transfer contacts B2 of relay B.

The next control pulse will operate relay J and a path will be completed from the positive terminal to ground thru the winding of relay C, contact 3 and armature 1 of transfer contacts B2 of relay B, contact 2 and armature 1 of transfer contacts D2 of relay D, contact 2 and armature 1 of transfer contacts F2 of relay F and make contacts J1 of relay J. Relay C will operate and complete a path from the positive terminal thru the windings of relays C and D, make contacts C1 of relay C and break contacts F1 of relay F to ground. Upon the absence of a control pulse activating relay J, make contacts J1 of relay J will open removing the ground connection between the windings of relays C and D. Relay D will operate. Upon the operation of relay D, armature 1 of transfer contacts D2 of relay D will disengage contact 2 and engage contact 3 of the transfer contacts D2 of the relay. Simultaneously, break contacts D1 of relay D will open inactivating relays B and A by disconnecting the ground connection to the windings thereof. The inactivation of relay B will cause armature 1 of transfer contacts B2 to disengage contact 3 and engage contact 2 of the transfer contacts B2 of the relay.

The next control pulse will activate relay J and complete a path from the positive terminal to ground thru the winding of relay E, contact 3 and armature 1 of transfer contacts D2 of relay D, contact 2 and armature 1 of transfer contacts F2 of relay F and make contacts J1 of relay J. Relay E will operate and complete a path from the positive terminal thru the windings of relays E and F, make contacts E1 of relay E and break contacts H1 of relay H to ground. Upon the absence of a control pulse activating relay J, make contacts J1 of relay J will open removing the ground connection between the windings of relays E and F. Relay F will operate. Upon the operation of relay F, armature 1 of transfer contacts F2 of relay F will disengage contact 2 and engage contact 3 of transfer contacts F2 of the relay. Simultaneously, break contact F1 of relay F will break, inactivating relays D and C by disconnecting the ground connection to the windings thereof. The inactivation of relay D will cause the armature 1 of transfer contacts D2 of relay D to disengage contact 3 and engage contact 2 of the transfer contacts D2 of the relay.

The next control pulse will activate relay J and complete a path from the positive terminal to ground thru the winding of relay G, contact 3 and armature 1 of transfer contacts F2 of relay F and make contacts J1 of relay J. The operation of relay G will complete a path from the positive terminal thru the windings of relays G and H, make contacts G1 of relay G and break contacts B1 of relay B to ground. Upon the absence of a control pulse activating relay J, make contacts J1 of relay J will open removing the ground connection between the windings of relays G and H. Relay H will operate. Upon the operation of relay H, break contact H1 will open disconnecting the ground connection to the windings of relays E and F, thereby, inactivating the relays. The inactivation of relay F causes armature 1 of transfer contacts F2 of relay F to disengage contact 3 and engage contact 2 of the transfer contacts F2 of the relay.

The next control pulse will operate relay J and complete a path thru the winding of relay A, the transfer contacts B2 of relay B, the transfer contacts D2 of relay D, the transfer contacts F2 of relay F and make contacts J1 of relay J to ground. When the ground connection between the windings of relays A and B is disconnected by the inactivation of relay J, relay B operates, as outlined above. The operation of relay B causes break contacts B1 to open disconnecting the ground connection to the windings of relays H and G, inactivating the relays. The sequence of operation of the circuit is, thereafter, the same as has been outlined in detail above.

The circuit described is known in the art as a "prime pair" counting circuit. Each control pulse serves to activate first one and, thereafter, a second of the relays included in the circuit. Each succeeding control pulse serves to activate a further pair of relays. A greater understanding of the circuit may be had by an examination of the timing diagram shown in Figure 3. The sequence of operation is clearly illustrated. The operation of relay J in response to a control pulse operates relay A which operates relay B, upon the inactivation of relay J. Upon the next control pulse operating relay J, relay C is operated and, thereafter, relays A and B are inactivated and relay D is operated, and so forth. Relays B, D, F and H are sequentially operated by the operation of relay J in response to a control pulse and a counting circuit is obtained.

The utilization circuit for the counting circuit is shown in Figure 2 immediately above the counting circuit. Make contacts B3 of relay B, D3 of relay D, F3 of relay F and H2 of relay H are connected in series with make contacts J2 of relay J between the positive terminal of a source of potential and ground. As previously pointed out, relays B, D, F and H are sequentially operated by the operation of relay J in response to control pulses fed by lead 3 from source 1. Referring to the timing diagram in Figure 3, relay B will be operated immediately upon the inactivation of relay J. Make contact B3 of relay B will be closed. Upon the next operation of relay J, however, relay B will remain activated until the sequence of operation of the relays in the circuit operates relay D, thereby, inactivating relay B. For this interval of time, therefore, a path is set up through make contacts J2 of relay J and make contacts B3 of relay B from a positive terminal to ground. This period of time is identified in Figure 3 as B3. In the same manner, a path will be set up from the positive terminal thru make contacts D3 of relay D, make contacts F3 of relay F and make contacts H2 of relay H. The respective intervals of time are identified in Figure 3 as D3, F3 and H2.

The sequence of operation of the counting circuit is such that during the periods B3, D3, F3 and H2 an electrical pulse may be fed through the leads 15, 16, 17 and 18 respectively, as shown in Figure 2. The sequential operation of the relays B, D, F and H insures that the contacts thereof will be operated in a desired timing relationship. A circuit is provided which will sequentially supply a control pulse to leads 15, 16, 17 and 18 in a timing relationship necessary for the proper operation of equipment to be operated in response to the control pulses fed over the respective leads.

Various arrangements may be utilized to sequentially operate a group of transmitters in response to the control pulses supplied by the counting circuit over leads 15, 16, 17 and 18. One such arrangement is shown in Figure 2. When relay B is operated, make contacts B3 and B4 will close. As shown in the timing diagram in Figure 3, relay J will be operated after relay B has been operated.

When relay J operates, a path is established from the positive terminal thru make contacts J2 of relay J, make contacts B3 of relay B, lead 15, lead 19 and make contacts B4 of relay B to the make contacts L3 of relay L via lead 20. However, as make contacts L3 of relay L remain in an open position, a path to ground thru the winding of the distributor release magnet 22 of transmitter W is not completed and an operate pulse will not appear on lead 15.

An operator in the meantime will have inserted a tape upon which a message to be transmitted is recorded, under the sensing contacts of massage transmitter A. Upon the insertion of the message tape, the tape stop contacts 23 will close. After the next pulse is fed to the counting circuit by relay J, relay D will operate. The operation of relay D will close the make contacts D3 of relay D. As shown in the timing diagram in Figure 3, relay J will be operated after relay D has been operated. When relay J operates, a path is completed from the positive terminal to ground thru make contacts J2 of relay J, make contacts D3 of relay D, lead 16, armature 1 and contact 3 of transfer contacts L1 of relay L, contact 2 and armature 1 of transfer contacts L2 of relay L, break contacts M1 of relay M, tape stop contacts 23 and the winding of the sensing magnet 24 of message transmitter A. The sensing magnet 24 will be energized, tripping the clutch of the sensing shaft. The sensing shaft will rotate once and in so doing brings the first character combination on the tape into position for transmission by the distributor of the transmitter. As the sensing shaft rotates, the contacts 25 are momentarily closed. The closure of contacts 25 completes a path from a positive terminal thru the winding of relay L to ground. The relay L will be held operated thru make contacts L4 of relay L and break contacts M2 of relay M to ground. The operation of relay L will cause make contacts L3 of relay L to close. Armature 1 of transfer contacts L1 will disengage contact 3 and engage contact 2 of transfer contacts L1 of relay L, and armature 1 of transfer contacts L2 will disengage contact 2 and engage contact 3 of transfer contacts L2 of relay L.

Following the operation of relay D, relay F will be operated and, when relay J operates in response to a control pulse fed from source 1, a path will be established from the positive terminal thru make contacts J2 of relay J, make contact F3 of relay F, lead 17, lead 19, lead 21 and make contacts F4 of relay F to make contacts N1 of relay N. As relay N remains inoperative, a path is not completed to ground thru the winding of the distributor release magnet 35 of transmitter X.

Upon the next operation of relay J, relay H being operated, a path will be completed from the positive terminal thru make contacts J2 of relay J, make contacts H2 of relay H, lead 18, armature 1 and contact 3 of transfer contacts N3 of relay N, contact 2 and armature 1 of transfer contacts N2 of relay N, break contacts O1 of relay O, tape stop contacts 36 and the winding of sensing magnet 37 of message transmitter B. Tape stop contacts 36 will have been closed by the insertion of a second message tape under the sensing contacts of message transmitter B by an operator. The transmitting control unit will operate message transmitter B in exactly the same manner as it did message transmitter A. It is unnecessary, therefore, to repeat in detail the sequence of operation outlined in connection with message transmitter A. The rotation of the sensing shaft by the energization of sensing magnet 37 will operate relay N by closing contacts 38, and the first character combination on the tape will be brought into position for transmission by the distributor of the transmitter.

The counting circuit having completed one full cycle of operation, relay B will again be operated. Upon the operation of relay J following the operation of relay B, a path will be completed from the positive terminal to ground thru make contacts J2 of relay J, make contacts B3 of relay B, lead 15, lead 19, lead 20, make contacts B4 of relay B, make contacts L3 of relay L and the winding of the distributor release magnet 22 of transmitter W. Transmitter W will transmit the character W due to the operation of the distributor therein by the energization of magnet 22. Following the transmission of one character W, transmitter W will be inactivated, the character W having been fed over transmission line 12 to receiving equipment at a distant location.

Relay D will, thereafter, be operated and, following the operation thereof, relay J will be operated in response to a control pulse from source 1. A path will be completed from the positive terminal to ground thru make contacts J2 of relay J, make contacts D3 of relay D, lead 16, armature 1 and contact 2 of transfer contacts L1 of relay L and the winding of the distributor release magnet 26 of message transmitter A. The distributor will be operated to transmit the character present in the sensing contacts of the message transmitter A over the transmission line 12 to receiving equipment connected thereto. During the operation of the distributor, contacts 27 will be closed completing a path from the positive terminal of a source of potential thru the contacts 27, contact 3 and armature 1 of transfer contacts L2 of relay L, break contacts M1 of relay M, tape stop contacts 23 and the winding of the sensing magnet 24 to ground. The sensing magnet will be energized to permit the sensing shaft to rotate to bring the next character combination on the message tape into the sensing contacts.

Relay F will, then, be operated and, following the operation thereof, relay J will be operated by a control pulse from source 1. The operation of relay J will complete a path from the positive terminal to ground thru make contacts J2 of relay J, make contacts F3 of relay F, lead 17, lead 19, lead 21, make contact F4 of relay F, make contact N1 of relay N and the winding of distributor release magnet 35 of transmitter X. Transmitter X will transmit one character X over the transmission line 12. After the one character has been transmitted, transmitter X will be inactivated.

The next control pulse will be fed from a source 1 to the counting circuit operating relay J. Relay H having previously been operated by the operation of relay G which was operated by the previous operation of relay J, a path is completed from the positive terminal to ground thru the make contacts J2 of relay J, make contacts H2 of relay H, lead 18, armature 1 and contact 2 of transfer contacts N3 of relay N and the winding of distributor release magnet 39 of message transmitter B. The distributor of the transmitter will transmit the character present in the sensing contacts thereof over transmission line 12 to receiving equipment connected thereto. As in the case of message transmitter A, contacts 40 of message transmitter B will be momentarily closed to cause the sensing shaft to bring the next character combination on the message tape into the sensing contacts of the transmitter.

It is well to remember at this point the sequence of operation of the counting circuit. The operation is such that relays B, D, F and H are sequentially operated as a part of the circuit. An examination of the circuit and of the timing diagram in Figure 3 shows that only one of these relays can be operated at a time. The operation of one of these relays dictates that the remainder remain inoperative. Therefore, the counting circuit supplies a control pulse sequentially to each of the transmitters, and cannot supply a control pulse simultaneously to a number of them. Only one transmitter will be operated at a time.

The transmitting control unit will continue to sequentially supply a control pulse to transmitter W to transmit a directing character W, to message transmitter A to transmit a message character, to transmitter X to transmit a directing character X and a message transmitter B to transmit a message character of a second message to be transmitted to receiving equipment connected thereto by transmission line 12. The transmitters will continue to be sequentially operated until the messages to be transmitted have been completed. In the example given in Figure 1, message transmitter A will transmit the word "buy," while message transmitter B will transmit the word "sell." It will require three cycles of operation of message transmitter A to transmit the three characters of the word "buy." However, message transmitter B must undergo four cycles of operation to transmit the four characters of the word "sell." Message transmitter A will complete its operation before message transmitter B. One of the features of the system of the invention is that the transmitters operate in pairs. The operation of transmitter W and message transmitter A is independent from that of transmitter X and message transmitter B. Even though a message may have been completed by one of the message transmitters, thereby rendering that transmitter and its associated directing character transmitter inoperatitve, the remaining message transmitter and its associated directing character transmitter will continue to operate until the particular message handled thereby is completely transmitted.

For example, when the character y, the last character of the word "buy," is transmitted by message transmitter A over transmission line 12, the sensing shaft will have been rotated to bring this last character into the sensing contacts. As the last character is brought into position for retransmission, the tape stop contacts 23 will open, breaking the circuit from the positive terminal to ground thru armature 1 and contact 3 of transfer contacts L2 of relay L and break contacts M1 of relay M and the winding of the sensing magnet 24 of the transmitter. As the distributor of message transmitter A transmits the character y, in response to an operate pulse from the counting circuit, the contacts 27 are closed. However, a path is no longer completed from the positive terminal to ground thru the contacts 27 and the winding of sensing magnet 24 because contacts 23 are now open. Full voltage will be fed to one side of the winding of relay M. The winding of relay M is connected in a bridge circuit including resistances 45 and 46 and the rise in voltage at one side of the winding results in the unbalancing of the bridge and, therefore, in the operation of relay M. A series diode 47 restricts currents attempting to flow in the opposite direction. When relay M operates, break contacts M2 of relay M open, removing the holding circuit from relay L by disconnecting the ground connection to the winding thereof. An additional break contact M1 will open and is provided to prevent maloperation of message transmitter A should tape stop contacts 23 reclose during the period of closure of contacts 27. Upon the inactivation of relay L, make contacts L3 will open. Armature 1 of transfer contacts L1 will disengage contact 2 and engage contact 3 of the transfer contacts L1 of relay L and armature 1 of transfer contacts L2 will disengage contact 3 and engage contact 2 of transfer contacts L2 of relay L. Transmitter W cannot be operated because make contacts L3 of relay L will remain open until message transmitter A is once again set for operation, thereby operating relay L. Message transmitter A will not operate in response to the operation of the counting circuit until the tape stop contacts 23 have been closed by the presence of a message under the sensing contacts of the transmitter.

The counting circuit will continue to deliver operate pulses to transmitter X and message transmitter B until the final character of the word "sell" is transmitted over transmission line 12. When the last character "l" is transmitted, relay O will operate in the same manner as did relay M in connection with message transmitter A to render message transmitter B and transmitter X inoperative.

As pointed out above, the transmitters are operated in pairs, a directing character transmitter and a message transmitter included in each pair. The pairs of transmitters may be operated independently or simultaneously. If the operator desires to now operate only one of the message transmitters, the intelligence carrying output circuits of the message transmitter and directing character transmitter associated therewith will utilize one-half of the full capacity of the channel of operation transmitted over transmission line 12. If both message transmitters A and B are operated, the full capacity of the channel of operation will be utilized.

It is not necessary that all four transmitters be of the same type. For example, a standard telegraph transmitter may be found sufficient for use as the directing transmitters W and X. A modified telegraph transmitter may be found to be best for use as the message transmitters A and B. It is important, however, that the characters transmitted by the transmitters be fed to the transmission line 12 in the proper time relationship. The response time of various types of telegraph transmitters that could be used as message transmitters may be slower than that of telegraph transmitters which would be suitable for use as directing character transmitters. The slower response of the message transmitters means that they would feed the message characters in an improper time relationship to and over transmission line 12. The characters on the line would overlap and, therefore, be mutilated. To avoid this difficulty, it is only necessary to connect lead 19 to the winding of a delaying device as a relay, the other side of which is grounded. Leads 20 and 21 would be connected to a positive terminal thru the contacts of the relay. The use of the relay would in no way affect the operation of the circuit as outlined above, but it would delay the response time of the directing transmitters to agree with that of the message transmitters. As the response time of all of the transmitters would now be uniform, the characters would be fed to the transmission line 12 by the transmitters in the proper time relationship and no mutilation of the characters would occur.

Figure 4 is a circuit diagram of a receiving director relay unit that in one embodiment may be used in the multiplex communication system of the invention, as shown in Figure 1. The intelligence carrying output circuits of the directing character transmitters W and X and message transmitters A and B are connected to the transmission line 12. The intelligence is transmitted over line 12 to receiving equipment located at a subscriber station or at a central office which services a number of subscribers. The receiving equipment, as shown in Figure 1, includes a perforator 13, which records the intelligence on a tape 14. The perforated tape 14 is then fed to a sensing mechanism 15. The holes in the tape 14 will be translated as conditions in the sensing contacts of the sensing mechanism 15. When a message is received, a sensing shaft included in the sensing mechanism 15 will complete one rotation so as to bring the first character combination perforated in the tape under the sensing contacts of the sensing mechanism 15. As shown in Figure 4, when the sensing shaft rotates, contacts 45 are momentarily closed by the shaft, completing a path from a positive terminal thru the winding of relay RA and contacts 45 to ground. Relay RA will operate. When the sensing shaft completes its rotation, the contacts 45 will be opened and relay RA inactivated by the disconnection of the ground connection to the winding thereof.

For purposes of description, it will be assumed that the first character combination perforated on the tape 14 is the directing character W transmitted by transmitter W. The sensing contacts of the sensing mechanism 15 will translate the holes into and transfer the character in the form of electrical impulses to the contacts 46 of distributor 16. At the same time, the sensing mechanism will complete a path from the positive terminal of a suitable source of potential to ground thru the winding of relay W and break contacts RH4 of relay RH. When relay W operates, make contacts W1 of relay W will close and a path will be completed from a positive terminal to ground thru make contacts W1 of relay W and the winding of relay RB, operating relay RB. Simultaneously, a path will be completed from the positive terminal to ground thu the winding of relay RE, break contacts RD1 of relay RD, make contacts W2 of relay W and break contacts RH1 of relay RH. Relay RE will operate. When relay RE operates, make contacts RE2 and make contacts RE3 of relay RE are closed connecting the contacts 46 of the distributor 16 to the receiver A, not shown, by lead 21. However, lead 21 continues to be shorted by a circuit traced thru break contacts RD2 of relay RD. The sensing shaft of sensing mechanism 15 then starts to rotate to bring the next character combination on the tape 14 under the sensing contacts of the mechanism. The next character will be a message character transmitted by message transmitter A. As the sensing shaft rotates, contacts 45 again are closed, the directing character W having been fed to the contacts 46 of distributor 16 by lead 17 from the sensing mechanism 15. The contacts 45 will be closed as the sensing shaft completes the insertion of the message character under the sensing contacts. Upon the closing of contacts 45, a path is completed from the positive terminal thru the winding of relay RA and contacts 45 to ground. Relay RA again will operate. It is to be remembered that relay RB was operated by the operation of relay W in response to the reception of the directing character W by the tape sensing mechanism 15 and that relay RB is still operated.

This operation of relay RA brings about several changes in the status of the circuit. A path is completed from the positive terminal to ground thru the make contacts RA2 of relay RA, make contacts RB2 of relay RB and the winding of relay RB. The path will serve as an additional holding circuit for relay RB, relay RB having previously been operated by the operation of relay W. A path is also completed from the positive terminal to ground thru the make contacts RA4 of relay RA, make contacts RB4 of relay RB and the winding of relay RH, operating relay RH. When relay RH operates, break contacts RH4 of relay RH will open disconnecting the ground connection to the winding of relay W. Relay W will be inactivated. When relay W is inactivated, make contacts W1 of the relay will open. However, the holding circuit thru the make contacts RA2 of relay RA and make contacts RB2 of relay RB will maintain relay RB in an operated condition.

When relay RH operates, a further path is completed from the positive terminal to ground thru make contacts RE4 of relay RE, make contacts RH3 of relay RH and the winding of relay RH, the path acting as a holding circuit for the relay RH. As pointed out above, when relay RE operates, by the operation of relay W, the contacts 46 of distributor 16 are connected to lead 21 to permit the passage of a character from the contacts 46 to a receiver A, not shown. The lead 21 is, however, shorted by the break contacts RD2 of relay RD and the passage of the character to receiver A is, therefore, prevented. An examination of relay RD in Figure 4 discloses that the operation of relay RE completes a path from the positive terminal to ground thru the winding of relay RE, the winding of relay RD, make contacts RE1 of relay RE and break contacts RC1 of relay RC. Relay RD, however, cannot operate. It will be remembered that the operation of relay W completed a path to ground thru the winding of relay RE, break contacts RD1 of relay RD and the break contacts RH1 of relay RH. A ground connection is made to a point between the windings of relays RE and RD. Inasmuch as the winding of relay RD is grounded at both ends, it cannot operate. When relay RH operates, break contacts RH1 of relay RH will open disconnecting the ground connection to the point between the windings of relays RE and RD. The ground shunt having been disconnected, relay RD will operate. Upon the operation of relay RD, break contacts RD2 of relay RD will open, removing the short circuit across lead 21 and connecting the contacts 46 of distributor 16 to receiver A.

In addition to the above sequence of operation brought about by the operation of relay RA, a path will be completed from the positive terminal to ground thru make contacts RB1 of relay RB, make contacts RA1 of relay RA and the winding of the distributor release magnet 47 of distributor 16. Upon the energization of the release magnet 47, the distributor shaft of distributor 16 will operate to transmit the message character which has been fed to the contacts 46 of the distributor 16 by the sensing mechanism 15. The message character will be transmitted by the distributor to the receiver A over lead 21.

It should be remembered at this point that relay RA will be momentarily operated by the sensing shaft of sensing mechanism 15 as the sensing shaft brings a character combination on tape 14 under the sensing contacts of the mechanism. By the time the sensing shaft completes one rotation, contacts 45 will be opened disconnecting the ground connection to the winding of relay RA, inactivating relay RA. The operation of relay RA is such as to supply a pulse of electrical energy to the winding of the distributor release magnet 47 of the distributor 16 to cause the distributor to transmit over lead 21 the message character which will be fed to the contacts 46 of the distributor. As soon as the pulse has been so supplied, relay RA will be inactivated. Upon the inactivation of relay RA, make contacts RA1 will open disconnecting the connection from the winding of distributor release magnet 47 to the positive terminal. The inactivation of relay RA will also cause make contacts RA2 of relay RA to open disconnecting the winding of relay RB from the positive terminal. Relay RB will also be inactivated.

During the time that the distributor 16 is transmitting the message character present in contacts 46 of the distributor, the sensing shaft of sensing mechanism 15 will be operating to bring the next character combination on tape 14 under the sensing contacts thereof. As the sensing shaft rotates contacts 45 will be closed. The operation of contacts 45 will complete a path from the positive terminal to ground thru the winding of relay RA and contacts 45, operating relay RA. Upon the operation of relay RA, a path is completed from the positive terminal to ground thru make contacts RA3 of relay RA, break contacts RB3 of relay RB, which is now inactivated, and the winding of relay RC, operating relay RC. When relay RC operates, break contacts RC1 of relay RC open. The opening of the break contacts RC1 of relay RC disconnects the ground connection to the windings of relays RD and RE. Relays RD and RE will be inactivated. Upon the inactivation of relay RE make contacts RE2 and make contacts RE3 of relay RE will open disconnecting the contacts 46 of distributor 16 from the lead 21. The inactivation of relay RD will cause the break contacts RD2 of relay RD to close, placing a short circuit across the lead 21. Immediately upon the operation of relay RC, however, make contacts RC3 will be closed placing a momentary short across lead 21 of sufficient duration to short the lead until the contacts RE2 and RE3 of relay RE are opened and the contacts RD2 of relay RD are closed.

Upon the inactivation of relay RE by the operation of relay RC, make contacts RE4 of relay RE will open, breaking the continuity of the holding circuit of relay RH. However, relay RH will not be inactivated. Upon the operation of relay RA, a path is completed from the positive terminal to ground thru make contacts RA4 of relay RA, make contacts RH2 of relay RH and the winding of relay RH. Relay RH will remain activated. As the sensing shaft of sensing mechanism 15 completes one rotation to bring the next character combination on the tape 14 under the sensing contacts of the mechanism, contacts 45 will be opened. When the contacts 45 open, the ground connection to the winding of relay RA will be disconnected, inactivating relay RA. Upon the inactivation of relay RA, the positive terminal will be removed from the winding of relay RC by the opening of make contacts RA3 of relay RA and from the winding of relay RH by the opening of make contacts RA4 of relay RA. Relays RC and RH will be inactivated. Upon the inactivation of relay RH, break contacts RH4 of relay RH will close and the ground connection will be restored to the winding of relay W.

The receiving director relay unit has now completed one full sequence of operation. A message character has been transmitted to receiver A which was selected by the presence of the directing character W preceding the message character as received by the sensing mechanism 15. A clearer understanding of the sequence of operation may be had by an examination of Figure 5 which is a timing diagram showing the operation of the various components of the receiving director relay unit. Reading from left to right, contacts 45 close and relay RA operates. During the closure of contacts 45, a new character combination is set up in the sensing mechanism. The character will, thereafter, be fed to the distributor 16. Assuming that the first character is the directing character W, relay W will operate. Upon the operation of relay W, relays RB and RE will operate, the operation of relay RE being shown as a dotted line. As the sensing shaft rotates to bring a new character combination under the sensing contacts of mechanism 15, contacts 45 will again close. The new character will be fed to the contacts 46 of distributor 16 as a message character.

The closing of contacts 45 will operate relay RA. When relay RA operates, relays RD and RH will be operated. A pulse will be supplied to the winding of the distributor magnet 47 causing the distributor to transmit the character present in the contacts 46 of the distributor over lead 21 to receiver A. When the sensing shaft has completed one rotation, contacts 45 will reopen. Upon the opening of the contacts, relays RA and RB will be inactivated. As the distributor 16 transmits the message character present in the contacts 46 of the distributor, as fed thereto by the sensing mechanism, the sensing shaft of the mechanism will be rotating to bring the next character combination under the sensing contacts of the sensing mechanism 15. As the shaft rotates, contacts 45 will be closed and relay RA will operate. Upon the operation of relay RA, relays RE and RD are inactivated by the operation of relay RC. When the sensing shaft has completed its rotation and a new character combination has been inserted under the sensing contacts, contacts 45 will be opened. Relay RA is inactivated, thereby, inactivating relays RH and RC. The relay unit has completed a full sequence of operation.

The following character fed to the tape sensing mechanism 15, if both message transmitter A and message transmitter B are operated, would be the directing character X. The sequence of operation is similar to that which takes place upon the reception of the directing character W and may be clearly understood from an examination of the timing diagram in Figure 5 in view of the exrelay X operates, relays RB and RG, the operation of the circuit when directing character W is received. The character X is fed to the distributor 16 by the tape sensing mechanism 15 which also operates relay X. When relay X operates, relays RB anh RG, the operation of relay RG being shown as a dotted line, will operate. As the sensing shaft rotates to bring the next character combination, a message character from message transmitter B, under the sensing contacts, contacts 45 will close. The closing of the contacts 45 operates relay RA. The operation of relay RA operates relay RH which, in turn, operates relay RF. A pulse will be fed to the winding of the distributor release magnet 47 and the distributor will be energized to transmit the message character present in the contacts 46 to the distributor thru make contacts RG3 and make contacts RG4 of relay RG, and lead 22 to the receiver B. The operation of relay RF will open the break contacts RF2 of relay RF, removing the short circuit across the lead 22.

While the distributor is transmitting the message character over lead 22, the sensing shaft will rotate to bring the next character under the sending contacts of the sensing mechanism 15. During the rotation, contacts 45 will close, operating relay RA. When relay RA operates, relays RG and RF are inactivated and relay RC is operated. When the sensing shaft completes its rotation, contacts 45 will open, inactivating relay RA. Relays RH and RC will be inactivated upon the inactivation of relay RA. The circuit will have been returned to its original condition. The next character received will be the directing character W and the sequence of operation will be the same as has been previously described.

The receiving director relay unit will, therefore, be operated so that all those message characters preceded by the directing character W will be retransmitted to the receiver A over lead 21. All of the message characters preceded by the directing character X will be retransmitted to the receiver B over lead 22.

Several important features of the system are now evident. The unit shown in Figure 4 will distribute the message characters received regardless of the number of message transmitters operated. In other words, message transmitter A may be used to transmit a single message over the transmission line 12 or message transmitter B may be so operated. If desired, both message transmitters may be operated to simultaneously transmit in interleaved manner messages over the line 12. In any case, the receiving directing relay unit distributes the message characters to the proper receiver in accordance with the directing character preceding each of the message characters. The leads 21 and 22 remain shorted by the contacts of relays RD and RF, respectively, during the time that a directing character is present in the contacts 46 of distributor 16 and no pulse will be delivered to its distributor release magnet 47, preventing the passage of the directing characters to the receivers A or B. The sequence of operation is such that only the message characters can be and will be distributed by distributor 16 to the respective receivers.

It is probable that the characters W and X may appear as message characters in the sensing contacts of sensing mechanism 15. Inasmuch as the circuit has been set to recognize these characters as directing characters, without proper provision being made, the circuit would operate in response to the reception thereof as though they were directing characters. This would be highly undesirable and would bring about the improper operation of the circuit. As previously pointed out, when a directing character has been received, relay RH will operate. When relay RH operates, break contacts RH4 of relay RH will open. Even though the message character which follows may be an X or W, relays X and W cannot operate because the ground connection has been disconnected from the windings thereof. Therefore, the presence of the characters X or W in the tape sensing mechanism 15 as message characters will in no way affect the sequence of operation of the circuit and the characters will be distributed by distributor 16 in the same manner as any other message characters.

In order to eliminate arcing across the contacts of the relays utilized in the transmitting control unit and the receiving director relay unit, a surge suppressor is connected directly across the winding of each relay. The surge suppressor may take the form of a pair of crystal diodes 28 and 29 connected as shown in Figures 2 and 4.

A multiplex communication system is obtained whereby a plurality of messages are received over a single message channel on a character by character basis. Each message character is preceded by a directing character, the directing character controlling the distribution of the succeeding message character so that the message characters are terminated at a particular receiver or recording device.

Having described the invention, we claim:

1. In combination, a telegraph transmitting station including a first telegraph transmitter adapted to repetitiously send a single character composed of a plurality of serially appearing signal elements, a second telegraph transmitter adapted to send messages composed of different characters each including a plurality of serially appearing signal elements, a telegraph receiving station including a receiving device, a telegraph transmission line extending from said transmitting station to said receiving station, means located at said transmitting station for sequentially operating said transmitters upon said second transmitter having a message to send so that each of said transmitters sends one character at a time over said line, each message character sent by said second transmitter being separated from the next message character by the single character repetitiously sent by said first transmitter, and means located at said receiving station responsive to the single characters sent by said first transmitter to forward the message characters sent by said second transmitter to said receiving device.

2. A multiplex telegraph system comprising, in combination, a first telegraph transmitter adapted to repetitiously transmit solely a single character having a plurality of serially appearing signal elements, a second telegraph transmitter adapted to transmit messages composed of different characters each having a plurality of serially appearing signal elements, said transmitters each requiring a control signal for enabling the same to transmit, telegraph receiving equipment, a single channel transmission line electrically interconnecting both of said transmitters and said receiving equipment, a source of control signals, means coupled between both of said transmitters and said source for sequentially operating said transmitters in response to said control signals upon said second transmitter having a message to transmit to cause each of them to transmit one character at a time over said line, each message character transmitted from said second transmitter being separated by the single character transmitted from said first transmitter from the next message character transmitted from said second transmitter, and means included in said receiving equipment responsive to said single characters received over said line for feeding said message characters received over said line to a receiving device.

3. A multiplex telegraph system comprising, in combination, a first telegraph transmitter adapted to repetitiously transmit solely a single character including a plurality of serially appearing signal elements, a second telegraph transmitter adapted to transmit messages composed of different characters including a plurality of serially appearing signal elements, said transmitters each requiring a control signal for enabling the same to transmit, telegraph receiving equipment, a single channel transmission line electrically interconnecting both of said transmitters and said receiving equipment, a source of control signals, a transmitting control unit including a plurality of electromagnetic relay devices coupled between both of said transmitters and said source, the devices in said control unit being arranged to operate upon said second transmitter having a message to transmit in response to said control signals to sequentially apply said control signals from said source to said transmitters, said transmitters being operated in response to said control signals to cause each to transmit one character at a time over said line so that each message character from said second transmitter is separated from the next message character from said second transmitter by said single character from said first transmitter, a director unit including a plurality of electromagnetic relay devices included in said receiving equipment, the devices in said director unit being arranged to operate in response to said single characters received over said line to feed said message characters received over said line to a receiving device.

4. A multiplex telegraph system comprising, in combination, first and second telegraph transmitters each adapted to repetitiously transmit solely a single character including a plurality of serially appearing signal elements, the character transmitted by said first transmitter being different from that transmitted by said second transmitter, third and fourth telegraph transmitters each adapted to transmit messages composed of different characters, said different characters each including a plurality of serially appearing signal elements, telegraph receiving equipment, a single channel transmission line electrically interconnecting all of said transmitters and said receiving equipment, means for operating said transmitters upon said third and fourth transmitters having messages to transmit in a sequence of said first, third, second and fourth transmitters to cause each to transmit one character at a time over said line, each message character transmitted by said third transmitter being preceded by said single character transmitted by said first transmitter and each message character transmitted by said fourth transmitter being preceded by said single character transmitted by said second transmitter, means included in said receiving equipment and responsive to the reception of said single characters transmitted over said line by said first transmitter to feed the message characters transmitted over said line by said third transmitter to a receiving device, and means also included in said receiving equipment and responsive to the reception of said single characters transmitted over said line by said second transmitter to feed said message characters transmitted over said line by said fourth transmitter to a second receiving device.

5. A multiplex telegraph system comprising, in combination, first and second telegraph transmitters each adapted to repetitiously transmit solely a single character including a plurality of serially appearing signal elements, the character transmitted by said first transmitter being different from that transmitted by said second transmitter, third and fourth transmitters each adapted to transmit messages composed of different characters, said different characters each including a plurality of serially appearing signal elements, said transmitters each requiring a control signal for enabling the same to transmit, telegraph receiving equipment, a single channel transmission line electrically interconnecting all of said transmitters and said receiving equipment, a source of control signals, a transmitter control unit including a plurality of switching devices coupled between said source and all of said transmitters, the devices in said control unit being responsive to said control signals upon said third and fourth transmitters having messages to transmit to sequentially apply said control signals from said source to said transmitters so that said transmitters are operated in a sequence of said first, third, second and fourth transmitters to cause each to transmit one character at a time over said line, each message character transmitted by said third transmitter being preceded by said single character transmitted by said first transmitter and each message character transmitted by said fourth transmitter being preceded by said single character transmitted by said second transmitter, a director unit including a plurality of switching devices included in said receiving equipment and responsive to the reception of said single characters transmitted over said line by said first transmitter to feed said message characters transmitted over said line by said third transmitter to a receiving device, said director unit being responsive to the reception of said single characters transmitted over said line by said second transmitter to feed said message characters transmitted over said line by said fourth transmitter to a second receiving device.

6. A multiplex telegraph transmitting station comprising a first telegraph transmitter adapted to repetitiously send a single character including a plurality of serially appearing signal elements, a second telegraph transmitter adapted to send messages composed of different characters each including a plurality of serially appearing signal elements, said transmitters each requiring a control signal for enabling the same to transmit, a source of control signals, a single channel telegraph transmission line connecting the output circuits of said transmitters to a remote receiver station, means including a plurality of switching devices connected to said source and said transmitters and arranged upon said second transmitter having a message to send to sequentially operate said transmitters by applying said control signals from said source to first one and then the other of said transmitters, said transmitters being responsive to said control signals to each transmit one character at a time over said line to cause each message character sent by said second transmitter to be separated from the next message character by the single character repetitiously sent by said first transmitter.

7. A multiplex telegraph transmitting system comprising, in combination, first and second telegraph transmitters each adapted to repetitiously transmit solely a single character including a plurality of serially appearing signal elements, the character transmitted by said first transmitter being different from that transmitted by said second transmitter, third and fourth transmitters each adapted to transmit messages composed of different characters, said different characters each including a plurality of serially appearing signal elements, said transmitters requiring a control signal for enabling the same to transmit, a single channel transmission line connected between all of said transmitters and a remote telegraph-receiving station, a source of control signals, means including a plurality of switching devices coupled between all of said transmitters and said source and operated upon said third and fourth transmitters having messages to transmit to sequentially apply said control signals from said source to said transmitters, said transmitters being operated in a sequence of said first, third, second and fourth transmitters to each transmit one character at a time over said line, whereby each message character transmitted by said third transmitter is preceded by said single character transmitted by said first transmitter and each message character transmitted by said fourth transmitter is preceded by said single character transmitted by said second transmitter.

8. In a multiplex telegraph communication system of the type wherein a first telegraph transmitter is adapted to repetitiously transmit solely a single character including a plurality of serially appearing signal elements and a second telegraph transmitter is adapted to transmit messages composed of different characters including a plurality of serially appearing signal elements, said transmitters being sequentially operated upon said second transmitter having a message to transmit to each transmit one character at a time over a single channel of operation, each message character transmitted by said second transmitter being separated from the next message character transmitted thereby by said single character transmitted by said first transmitter, a multiplex telegraph receiving circuit comprising, in combination, means for connecting said circuit to said channel, a first switching device, a plurality of other switching devices, said first device being responsive to the reception by said circuit of said single characters to operate said other devices in a predetermined sequence to feed said message characters to a receiving device.

9. In a multiplex telegraph communications system of the type including first and second telegraph transmitters adapted to repetitiously transmit solely a single character including a plurality of serially appearing signal elements, the single character transmitted by said first transmitter being different from that transmitted by said second transmitter, a third and fourth telegraph transmitter each adapted to transmit messages composed of different characters including a plurality of serially appearing signal elements, said transmitters being operated upon said third and fourth transmitters having messages to transmit in a sequence of said first, third, second and fourth transmitters to each transmit one character at a time over a single channel of operation, each message character transmitted by said third transmitter being preceded by said single character transmitted by said first transmitter and each message character transmitted by said fourth transmitter being preceded by said single character transmitted by said second transmitter, a multiplex telegraph receiving circuit comprising, in combination, means for connecting said circuit to said channel, first and second switching devices, a plurality of other switching devices, means for operating said first device upon the reception by said circuit of said single characters transmitted by said first transmitter to operate said other devices to feed said message characters transmitted by said third transmitter to a receiving device, said second device being operated by said last-mentioned means upon the reception by said circuit of said single characters transmitted by said second transmitter to operate said other devices to feed said message characters transmitted by said fourth transmitter to a second receiving device.

10. In a multiplex telegraph communication system of the type wherein a first telegraph transmitter is adapted to transmit a message composed of different characters each including a plurality of serially appearing signal elements and a second telegraph transmitter is adapted to repetitiously transmit solely a single one of said characters, said transmitters being sequentially operated upon said first transmitter having a message to transmit whereby each transmits one character at a time over a single channel of operation, each message character transmitted by said first transmitter being separated from the next message character transmitted thereby by said single character transmitted by said second transmitter, a multiplex telegraph receiving circuit comprising, in combination, means for connecting said circuit to said channel, a first switching device, a plurality of other switching devices, means for operating said first device upon the reception of said single character when transmitted by said second transmitter to operate said other devices to feed the message character transmitted by said first transmitter and following said single character to a receiving device, and means for preventing the operation of said first device in response to the reception of any of said characters including said single character when transmitted by said first transmitter.

11. In combination, a telegraph transmitting station comprising a first telegraph transmitter adapted to repetitiously send solely a single character including a plurality of serially appearing signal elements, a second telegraph transmitter adapted to send messages composed of different characters including a plurality of serially appearing signal elements, the message characters transmitted by said second transmitter being arranged in groups having different numbers of said message characters included therein, a telegraph receiving station, a single channel telegraph tranmsission line connected between both of said transmitters and said receiving station, means located at said transmitting station to sequentially operate said transmitters upon said second transmitter having a message to transmit to cause each to transmit one character at a time over said line so that each message character transmitted by said second transmitter is separated by said single character transmitted by said first transmitter from the next message character transmitted by said second transmitter, and means located at said receiving station operated in response to said single characters transmitted by said first transmitter to feed said message characters transmitted by said second transmitter to a receiving device.

12. A telegraph transmitting system comprising first and second telegraph transmitters each adapted to repetitiously transmit a single character including a plurality of serially appearing signal elements, the character transmitted by said first transmitter being different from that transmitted by said second transmitter, third and fourth telegraph transmitters each adapted to transmit messages composed of different characters each including a plurality of serially appearing signal elements, a single channel transmission line connected between all of said transmitters and a remote telegraph receiving station, a control unit arranged to sequentially place in operation said first and third transmitters only when said third transmitter has a message to transmit and to sequentially place in operation said second and fourth transmitters only when said fourth transmitter has a message to transmit, only one of said transmitters being operated at a time by said control unit to transmit upon being placed in operation one character over said line, said control unit being arranged to place said transmitters in operation when both said third and fourth transmitters have messages to transmit in a sequence of said first, third, second and fourth transmitters to each transmit one character at a time over said line, whereby each message character transmitted by said third transmitter is preceded by said single character transmitted by said first transmitter and each message character transmitted by said fourth transmitter is preceded by said single character transmitted by said second transmitter.

13. A telegraph transmitting system comprising first and second telegraph transmitters each adapted to repetitiously transmit a single character including a plurality of serially appearing signal elements, the character transmitted by said first transmitter being different from that transmitted by said second transmitter, third and fourth telegraph transmitters each adapted to transmit messages composed of different characters each including a plurality of serially appearing signal elements, said transmitters requiring a control signal for enabling the same to transmit, a single channel transmission line connected between all of said transmitters and a remote telegraph receiving station, a source of control signals, a control unit arranged to sequentially apply said control signals from said source to said first and third transmitters only when said third transmitter has a message to transmit and to sequentially apply said control signals from said source to said second and fourth transmitters only when said fourth transmitter has a message to transmit, only one of said transmitters being operated at a time by said control unit in response to said control signals to transmit one character over said line, said control unit being arranged to sequentially apply said control signals to said transmitters to operate said transmitters when both said third and fourth transmitters have messages to transmit in a sequence of said first, third, second and fourth transmitters to each transmit one character at a time over said line, whereby each message character transmitted by said third transmitter is preceded by said single character transmitted by said first transmitter and each message character transmitted by said fourth transmitter is preceded by said single character transmitted by said second transmitter.

14. A telegraph transmitting system comprising first and second telegraph transmitters each adapted to repetitiously transmit a single character including a plurality of serially appearing signal elements, the character transmitted by said first transmitter being different from that transmitted by said second transmitter, third and fourth telegraph transmitters each adapted to transmit messages composed of different characters each including a plurality of serially appearing signal elements, said transmitters requiring a control signal for enabling the same to transmit, a remote telegraph receiving station having first and second receiving devices, a single channel transmission line connected between all of said transmitters and said receiving station, a source of control signals, a control unit arranged to sequentially apply said control signals from said source to said first and third transmitters only when said third transmitter has a message to transmit and to sequentially apply said control signals from said source to said second and fourth transmitters only when said fourth transmitter has a message to transmit, only one of said transmitters being operated at a time by said control unit in response to said control signals to transmit one character over said line, said control unit being arranged to sequentially apply said control signals to said transmitters to operate said transmitters when both said third and fourth transmitters have messages to transmit in a sequence of said first, third, second and fourth transmitters to each transmit one character at a time over said line, each message character transmitted by said third transmitter being preceded by said single character transmitted by said first transmitter and each message character transmitted by said fourth transmitter being preceded by said single character transmitted by said second transmitter, a director unit located at said receiving station and responsive to the reception of the single characters transmitted over said line by said first transmitter to feed said message characters transmitted over said line by said third transmitter to said first receiving device, said director unit being responsive to the reception of the single characters transmitted over said line by said second transmitter to feed said message characters transmitted over said line by said fourth transmitter to said second receiving device.

15. A telegraph transmitting system comprising first and second telegraph transmitters each adapted to repetitiously transmit a single character including a plurality of serially appearing signal elements, the character transmitted by said first transmitter being different from that transmitted by said second transmitter, third and fourth telegraph transmitters each adapted to transmit messages composed of different characters each including a plurality of serially appearing signal elements, said transmitters requiring a control signal for enabling the same to transmit, a remote telegraph receiving station having first and second receiving devices, a single channel transmission line connected between all of said transmitters and said receiving station, a source of control signals, a control unit arranged to sequentially apply said control signals from said source to said first and third transmitters only when said third transmitter has a message to transmit and to sequentially apply said control signals from said source to said second and fourth transmitters only when said fourth transmitter has a message to transmit, only one of said transmitters being operated at a time by said control unit in response to said control signals to transmit one character at a time over said line, said control unit being arranged to sequentially apply said control signals to said transmitters to operate said transmitters when both said third and fourth transmitters have messages to transmit in a sequence of said first, third, second and fourth transmitters to each transmit one character at a time over said line, each message character transmitted by said third transmitter being preceded by said single character transmitted by said first transmitter and each message character transmitted by said fourth transmitter being preceded by said single character transmitted by said second transmitter, first and second switching devices located at said receiving station, a plurality of other switching devices located at said receiving station, means for operating said first device upon the reception at said receiving station of the single characters transmitted by said first transmitter to operate said other devices to feed said message characters transmitted by said third transmitter to said first receiving device, said second device being operated by said last-mentioned means upon the reception at said receiving station of the single characters transmitted by said second transmitter to operate said other devices to feed said message characters transmitted by said fourth transmitter to said second receiving device.

16. In combination, a telegraph transmitting station including a first telegraph transmitter adapted to repetitiously send a single character composed of a plurality of serially appearing signal elements, a second telegraph transmitter adapted to send messages composed of different characters each including a plurality of serially appearing signal elements, a telegraph receiving station, means adapted to carry intelligence from said transmitting station to said receiving station, means located at said transmitting station for sequentially operating said transmitters upon said second transmitter having a message to send so that each of said transmitters sends one character at a time to said receiving station, each message character sent by said second transmitter being separated from the next message character by the single character repetitiously sent by said first transmitter, and means located at said receiving station responsive to the single characters sent by said first transmitter to forward the message characters sent by said second transmitter to a receiving device.

References Cited in the file of this patent

UNITED STATES PATENTS

| | | |
|---|---|---|
| 1,986,768 | Dirkes et al. | Jan. 1, 1935 |
| 2,068,711 | Robinson et al. | Jan. 26, 1937 |
| 2,210,577 | Fitch | Aug. 6, 1940 |
| 2,429,631 | Labin et al. | Oct. 28, 1947 |
| 2,504,999 | McWhirter et al. | Apr. 25, 1950 |

UNITED STATES PATENT OFFICE

CERTIFICATE OF CORRECTION

Patent No. 2,905,760

September 22, 1959

William E. Walker et al.

It is hereby certified that error appears in the printed specification of the above numbered patent requiring correction and that the said Letters Patent should read as corrected below.

Column 13, line 63, strike out "relay X operates, relays RB and RG," and insert instead -- planation given above in connection with --.

Signed and sealed this 17th day of May 1960.

(SEAL)

Attest:

KARL H. AXLINE

Attesting Officer

ROBERT C. WATSON

Commissioner of Patents